March 13, 1962 G. D. WOLF 3,025,408
EMERGENCY POWER SUPPLY
Filed Sept. 23, 1958 2 Sheets-Sheet 1
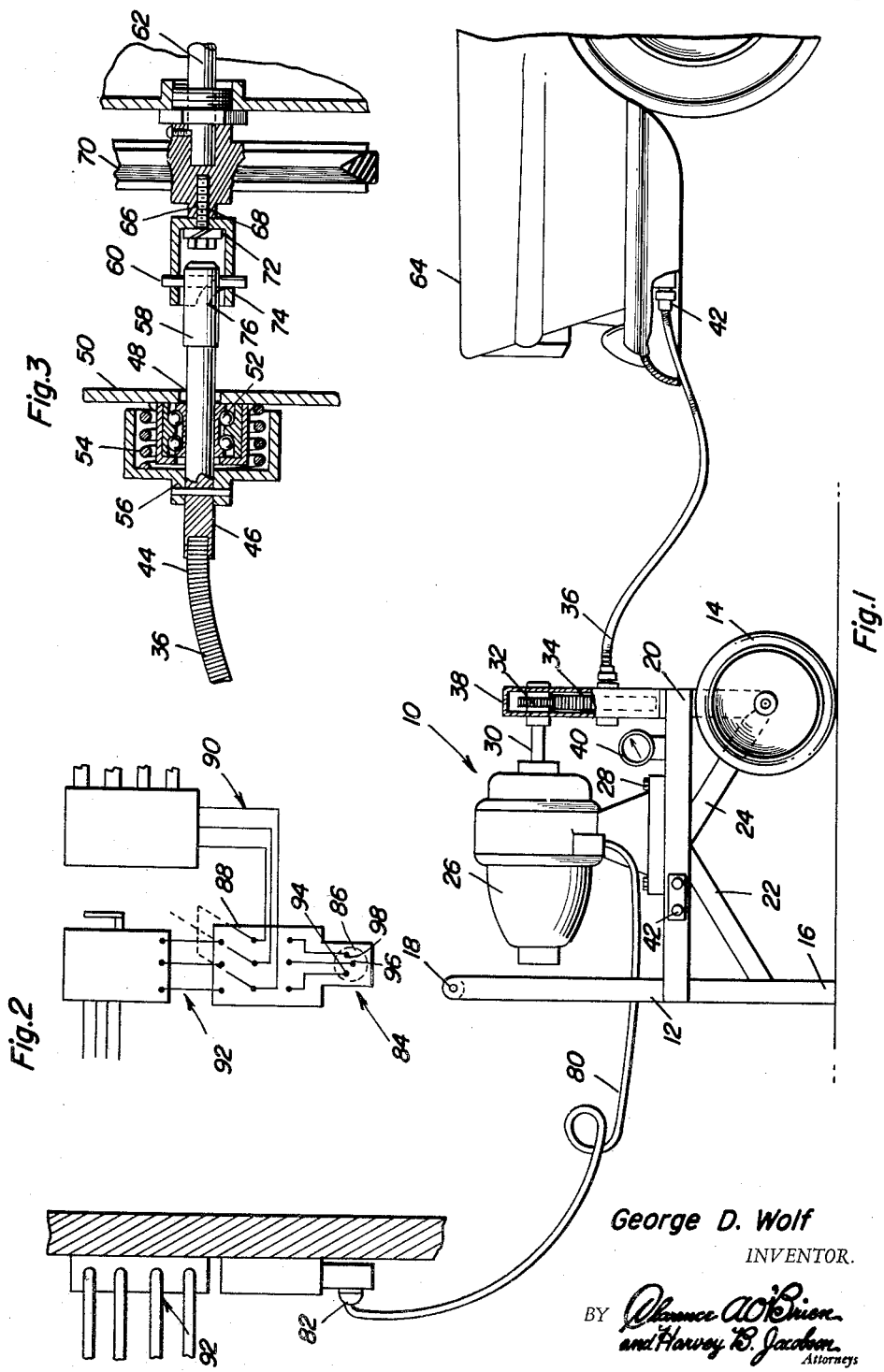
George D. Wolf
INVENTOR.
BY Clarence A. O'Brien
and Harvey B. Jacobson
Attorneys March 13, 1962 G. D. WOLF 3,025,408
EMERGENCY POWER SUPPLY
Filed Sept. 23, 1958 2 Sheets-Sheet 2
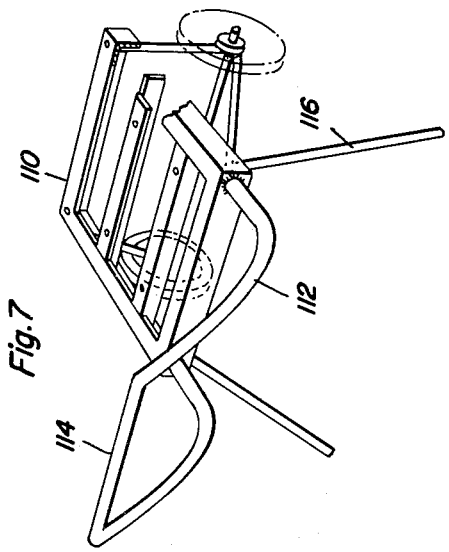
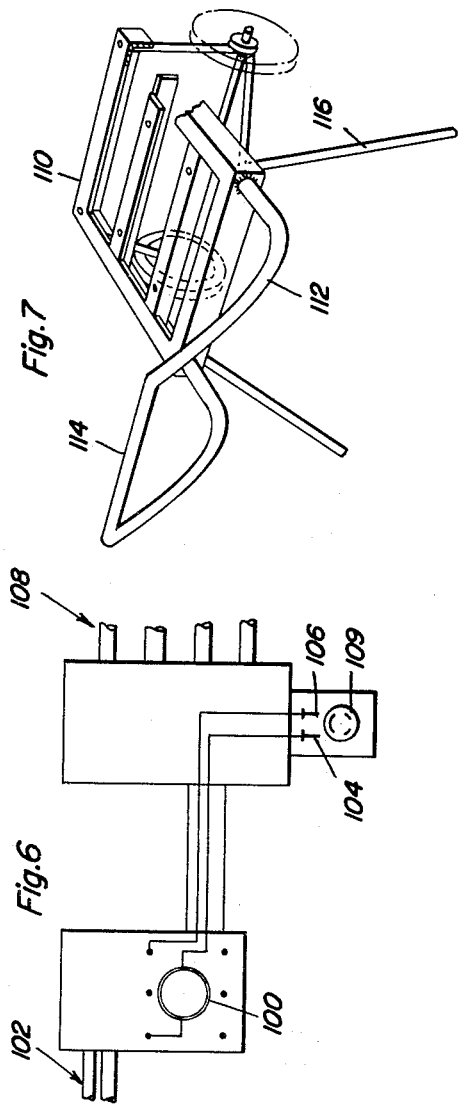
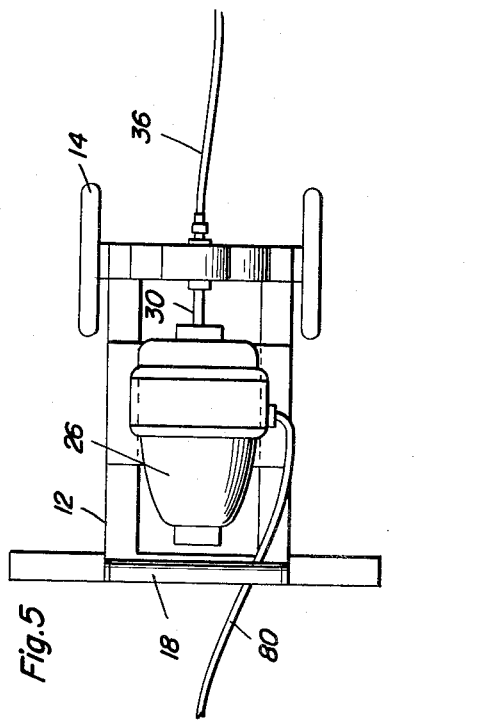
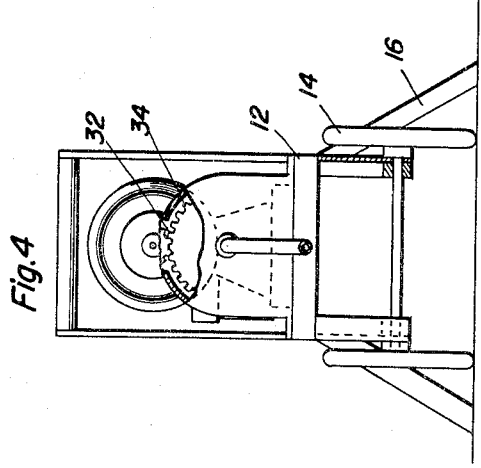
George D. Wolf
INVENTOR.
BY *Clarence A O'Brien*
*and Harvey B. Jacobson*
Attorneys United States Patent Office 3,025,408
Patented Mar. 13, 1962

3,025,408
EMERGENCY POWER SUPPLY
George D. Wolf, 464 Madison Ave., Toms River, N.J.
Filed Sept. 23, 1958, Ser. No. 762,794
7 Claims. (Cl. 290—1)

This invention relates in general to electric power supplies and more particularly to an emergency power supply particularly developed to take the place of the main utility power supply in the event of a failure during a storm, floods, etc.

In almost all of the areas of the nation, overhead electrical transmission and distribution lines are used to carry electric power from generating stations to the home consumer. Only in urban communities are underground electric lines utilized for it is only there that the electrical load in a small area merits the additional economic outlay necessitated by the extreme expense involved in putting wires underground. It is common knowledge that the overhead lines are often adversely affected by weather conditions and each year hundreds of thousands of electrical consumers find themselves without electrical power for varying durations of time. The loss of electrical power is an extreme hardship in many communities where electricity is used to operate the heating means, such as oil burners, and the pumps for water distribution. Further, the loss of lighting proves an extreme inconvenience and many man hours of labor and production are lost each year due to electrical power failure caused by the idiosyncrasies of the weather.

Accordingly, the applicant has developed a novel and simple electrical generator set for utilization with the conventional automobile for supplying sufficient electrical power to operate an oil burner, refrigerator, water pump, and lamps. It is well known to the applicant that gasoline engine and electrical generator sets have long been on the market and would serve substantially the same purpose as the applicant's invention. However, during recent storms, it has been discovered that since the engine generator sets were not often utilized, they were not in proper operating condition when the emergency arose and therefore were worthless as emergency power supplies. It is well known that in order to operate properly, engines and generators must be run frequently to maintain them in stand-by condition. Therefore, the applicant developed the present invention in consideration of the fact that most home-owners in this country own automobiles which are frequently utilized and which would provide an adequate emergency driving means.

It is therefore the principal object of this invention to provide a novel emergency electric power supply which is simple in construction, relatively inexpensive, and portable.

It is an object of this invention to provide an emergency electrical power supply which while incorporating the above noted characteristics, is capable of electrically maintaining the average home in the event of a utility power failure.

It is a still further object of this invention to provide a novel combination of a driving source and generator means wherein a conventional automobile is utilized to drive the generator set.

It is a still further object of this invention to provide a novel electrical distribution means for connecting the generator to a home distribution system.

It is a still further object of this invention to provide novel coupling means for operatively connecting an automobile shaft to a generator.

In accordance with the above stated objects, below is described the combination of a conventional automobile having an engine and a rotatable shaft member driven by the engine and an emergency electrical power supply for use in the event of a failure of a main utility power supply. The emergency power supply includes a frame supported by rotatable wheels for providing easy transportation of the power supply. An electrical generator is carried by the frame and a flexible cable is rotatably supported by the frame and operatively connects the generator to a rotatable shaft of the automobile through a gear train. Electrical distribution means are connected to the generator and include an electric cable and a plug electrically connected to the cable. A twist-lock electric receptacle is adapted to electrically receive the plug. The twist-lock operates means for electrically connecting the plug to a desired load, such as the home distribution system, and disconnect the main utility power supply from the load.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary elevational view partially cut-away illustrating the emergency power supply driven by a rotatable automobile shaft and providing electricity to a home distribution system;

FIGURE 2 is a schematic diagram illustrating the electrical connection between the emergency power supply, utility power supply, and home distribution system;

FIGURE 3 is a detailed sectional fragmentary view illustrating one method of coupling a flexible cable to a rotatable automobile shaft;

FIGURE 4 is an elevational end view partially cut-away of the emergency power supply;

FIGURE 5 is an elevational plan view of the emergency power supply;

FIGURE 6 is a schematic view illustrating another method of connecting the emergency power supply, utility power supply, and distribution circuit; and FIGURE 7 is a perspective view partially cut away illustrating a modified emergency power supply supporting frame.

With continuing reference to the drawings and initial reference to FIGURE 1, numeral 10 generally represents the emergency power supply including a frame 12 having depending rotatable wheels 14 and fixed legs 16 for providing stability. A handle 18 is conveniently supported on the upper portion of the legs 16 for allowing a force to be imparted to the frame 12 for moving the frame 12 on the rotatable wheels 14. The shelf portion 20 is perpendicularly connected to the legs 16 while struts 22 and 24 provide support to help carry the load supported by the member 20.

An electrical generator 26, which may be of any well-known variety of types, is bolted by bolts 28 to the supporting shelf member 20 on frame 12. It is contemplated that the generator generally having a capacity of 2000 watts for providing adequate emergency source for the average home. Of course, the desired ratings of the generator 26 should be dictated by the particular power requirement of the load. The generator shaft 30 has a gear 32 terminally fixed thereon which meshes with the gear 34 terminally fixed to a rotatable cable 36. The meshed gears 32 and 34 are enclosed within the housing 38. An instrument such as a volt meter 40 may be electrically connected to the generator 26 for providing indication of the output of the generator when operating. Further, fuses 42 may be provided for electrically protecting the equipment.

The rotatable flexible cable 36 is terminally threaded at 44 and adapted to be received in an internally threaded shaft extension 46. The shaft extension 46 passes through an aperture 48 and the plate 50 which may be permanently fastened to the front end of an automobile. Ball bearings 52 are fixed to the plate 50 for facilitating the rotation of shaft 46. A helical spring 54 is seated about the ball bearings 52 and is enclosed within the housing 56 which is fixed to the shaft extension 46. A collar member 58 is forcibly terminally fitted about the shaft extension 46 and has a projecting pin 60 passing through an aperture therethrough.

A crankshaft 62 of an automobile 64 is drilled at 66 to threadedly receive a bolt 68. The shaft 62 is terminally drilled adjacent the fan belt 70. The bolt 68 and accompanying washer 72 fasten a tubular female extension coupler or socket 74 to the crankshaft 62. A spiral slot is provided in the extension coupler for receiving the projecting pin 60. Therefore, in order to operatively connect the shaft extension 46 to the shaft 62, the shaft 46 may be pushed inwardly against the spring urging of spring 54 until the protruding pin 60 enters the slots 76 and extension coupler 74. A rotation of the shaft extension 46 then carries the pin 60 to a position in slots 76 whereby the collar 58 will be maintained within the coupler 74. The rotation of shaft 62 will then drive the shaft extension 46 and flexible cable 36 through protruding pin 60. To release the connection between the shaft extension 46 and shaft 62, opposite rotational force on the shaft extension 46 will cause the protruding pin 60 to move out of the slots 76 and the spring 54 will withdraw the shaft extension 46 from the tubular extension coupler 74. Therefore, it is apparent that under normal operating circumstances, the automobile will operate without turning shaft extension 46.

An electric cable 80 is electrically connected to the output of the generator 26 and terminates in an electric plug 82. So as not to feed the power generated by the generator 26 into the lines of the main utility power supply, means have been provided for automatically disconnecting the main utility power supply from the home distribution supply upon connection of the emergency power supply from plug 82. More particularly referring to FIGURE 2, a twist-lock 84 is illustrated wherein a rotatable receptacle 86 is adapted to electrically receive the plug 82. The rotatable receptacle 86 operates a double-throw switch 88 which disconnects the home distribution lines 90 from the main utility power supply 92. The electrical energy from the generator 26 is passed through the electric cable 80 through the plug 82 to the terminals 94, 96 and 98 of the rotatable receptacle 86 and the energy is carried through the double-throw switch 88 to the home distribution system 90.

An alternate method of distribution involves the utilization of an electromagnetic coil 100, shown in FIGURE 6, which is normally energized from the main utility supply 102 through a pair of normally closed contacts 104 and 106. The electromagnetic coil 100 operates a relay for connecting the main utility supply 102 to the home distribution line 108. Upon insertion of the plug 82 into a rotatable receptacle 109, the normally closed electrical connection between contacts 104 and 106 is broken and an electrical connection is made from the generator 26 through the plug 82 to the home distribution line 108. The utilization of the twist receptacle either 98 or 109, assures that the electrical energy generated by the generator 26 will not be fed back to the main utility lines 92 or 102, but will be fed to the desired home distribution lines 90 or 108.

It is to be noted that in the utilization of the automobile 64 for driving the generator 26, the automobile should be faced with the exhaust toward the open side of a garage for lessening the danger of gas poisoning. Generally, an automobile will idle at approximately 400 r.p.m. and the gear train including gears 32 and 34 is generally necessary to drive the generator 26 at the required approximate 1600 r.p.m. If necessary, the accelerator may be slightly depressed to more effectively drive the generator 26.

FIGURE 7 illustrates a modified embodiment of the frame 12 wherein the frame 110 is utilized having arcuate rearwardly extending handles 112 connected by a cross-bar 114. Further, the rear outwardly extending legs 116 are provided for support and stability of the frame 110. Though the frame 12 illustrated in FIGURE 1, which may be a conventional garden hose cart would generally suffice to adequately carry the generator 26, the frame 110 may be utilized for heavier loads.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in conjunction with a conventional automobile having an engine and a rotatable shaft member driven by said engine, an emergency electrical power supply for use in the event of a failure of a main power supply comprising a frame, an electrical generator carried by said frame, a flexible cable rotatably supported by said frame operatively connecting said shaft to said generator, and electrical distribution means connected to said generator for distributing generated electric power, said distribution means including an electric cable, a plug electrically connected to said cable, a twist-lock electric receptacle adapted to receive said plug, means operated by said twist lock for electrically connecting said plug to a desired load and automatically disconnecting said main power supply from said load.

2. For use in conjunction with a conventional automobile having an engine and a rotatable shaft member driven by said engine, an emergency electrical power supply for use in the event of a failure of a main power supply comprising a frame, rotatable wheels dependingly supported from said frame, a flexible cable rotatably supported by said frame, a gear train, said flexible cable operatively connecting said shaft to said generator through said gear train, and electrical distribution means connected to said generator for distributing generated electric power, said distribution means including an electric cable, a plug electrically connected to said cable, a twist-lock electric receptacle adapted to receive said plug, means operated by said twist lock for electrically connecting said plug to a desired load and automatically disconnecting said main power supply from said load.

3. For use in conjunction with a conventional automobile having an engine and a rotatable shaft member driven by said engine, an emergency electrical power supply for use in the event of a failure of a main power supply comprising a frame, an electrical generator carried by said frame, a flexible cable rotatably supported by said frame operatively connected to said generator, a tubular extension coupler fixed to said shaft, a shaft extension rotatably supported near said extension coupler but normally spaced therefrom, means for releasably engaging said extension coupler with said shaft extension for rotatably driving said shaft extension by said shaft, terminal means carried by said shaft for releasably engaging said flexible cable, and electrical distribution means connected to said generator for distributing generated electric power, said distribution means including an electric cable, a plug electrically connected to said cable, a twist-lock electric receptacle adapted to receive said plug, means operated by said twist lock for electrically connecting said plug to a desired load and automatically disconnecting said main power supply from said load.

4. Means for rotatably driving a cable by a vehicle crankshaft comprising an extension coupler, said coupler secured to one end of said crankshaft in alignment therewith, said cable operatively connected to said coupler, said coupler including an upstanding wall defining a pair of opposed spiral slots therein, said cable having a transverse pin terminally secured thereto, said pin receivable in said slots.

5. Means for rotatably driving a cable by a vehicle crankshaft comprising an extension coupler, said coupler secured to one end of said crankshaft in alignment therewith, said cable operatively connected to said coupler, said coupler including an upstanding wall defining a pair of opposed spiral slots therein, said cable having a transverse pin terminally secured thereto, said pin receivable in said slots, and spring means urging said cable longitudinally for urging said pin against said wall adjacent said slots.

6. An emergency electrical power unit comprising a mobile generator, a flexible drive shaft operatively connected to said generator, and means for connecting said shaft to an automobile engine crankshaft for actuation thereby, said means including a socket mounted longitudinally on one end of the crankshaft, said socket having slots extending spirally thereinto from the open end thereof, a plate mounted on the automobile adjacent to the socket and having an opening therein aligned therewith, a bearing mounted on the plate coaxially with the opening, a rigid shaft rotatably and slidably mounted in the bearing and operable in the opening and having one end portion affixed to the flexible shaft, the other end portion of said rigid shaft being engageable longitudinally in the socket, a pin on said other end portion of said rigid shaft engageable in the slots for detachably connecting said rigid shaft to the crankshaft, and means for disconnecting the rigid shaft from the crankshaft.

7. An emergency electrical power unit comprising a mobile generator, a flexible drive shaft operatively connected to said generator, and means for connecting said shaft to an automobile engine crankshaft for actuation thereby, said means including a socket mounted longitudinally on one end of the crankshaft, said socket having slots extending spirally thereinto from the open end thereof, a plate mounted on the automobile adjacent to the socket and having an opening therein aligned therewith, a bearing mounted on the plate coaxially with the opening, a rigid shaft rotatably and slidably mounted in the bearing and operable in the opening and having one end portion affixed to the flexible shaft, the other end portion of said rigid shaft being engageable longitudinally in the socket, a pin on said other end portion of said rigid shaft engageable in the slots for detachably connecting said rigid shaft to the crankshaft, and means for disconnecting the rigid shaft from the crankshaft, the last named means comprising a generally cup-shaped housing affixed to the rigid shaft and adapted to receive the bearing therein, and a coil spring mounted on the plate and encircling the bearing and engaged in the housing for actuating the rigid shaft longitudinally for withdrawing same from the socket and disengaging the pin from the slots.

References Cited in the file of this patent
UNITED STATES PATENTS

| | | |
|---|---|---|
| 881,599 | Maher | Mar. 10, 1908 |
| 1,627,126 | Tamini | May 3, 1927 |
| 2,000,161 | Burgett | May 7, 1935 |
| 2,600,643 | Hagelgantz | June 17, 1952 |
| 2,733,661 | Surgi | Feb. 7, 1956 |
| 2,790,292 | Trecker | Apr. 30, 1957 |

UNITED STATES PATENT OFFICE
CERTIFICATE OF CORRECTION

Patent No. 3,025,408                      March 13, 1962

George D. Wolf

It is hereby certified that error appears in the above numbered patent requiring correction and that the said Letters Patent should read as corrected below.

Column 2, line 11, for "twist-lock" read -- rotatable locking --; line 13, for "twist-lock" read -- receptacle --; column 3, line 41, for "twist-lock" read -- rotatable locking connector --; column 4, line 31, for "twist-lock" read -- rotatable locking --; line 33, for "twist lock" read -- receptacle --; lines 47 and 48, for "twist-lock" read -- rotatable locking --; line 48, for "twist lock" read -- receptacle --; lines 68 and 69, for "twist-lock" read -- rotatable locking --; same column 4, line 70, for "twist lock" read -- receptacle --.

(SEAL)           Signed and sealed this 23rd day of April 1963.
Attest:

ERNEST W. SWIDER                      DAVID L. LADD
Attesting Officer                        Commissioner of Patents